(No Model.) 4 Sheets—Sheet 1.
T. CARNEY.
CASH REGISTER AND INDICATOR.

No. 377,728. Patented Feb. 7, 1888.

Witnesses:
Albert N. Adams.
Harry T. Jones.

Inventor:
Thomas Carney (No Model.) 4 Sheets—Sheet 2.
T. CARNEY.
CASH REGISTER AND INDICATOR.
No. 377,728. Patented Feb. 7, 1888.
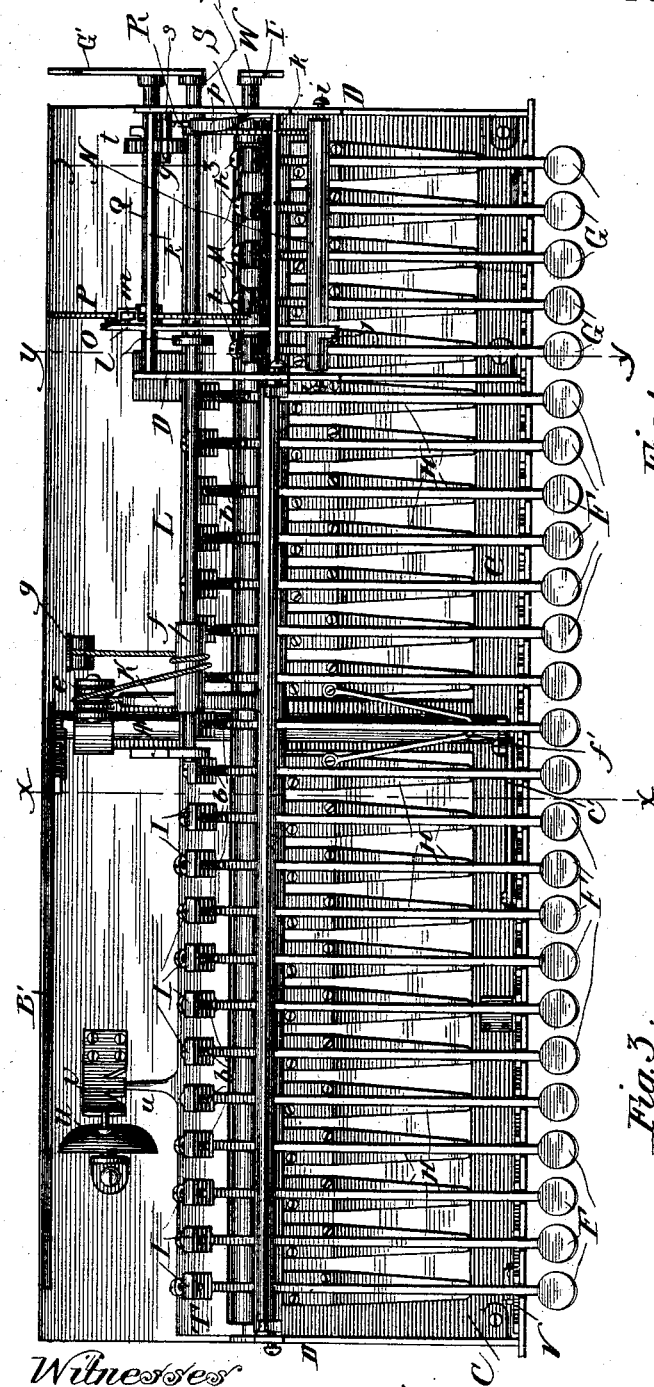
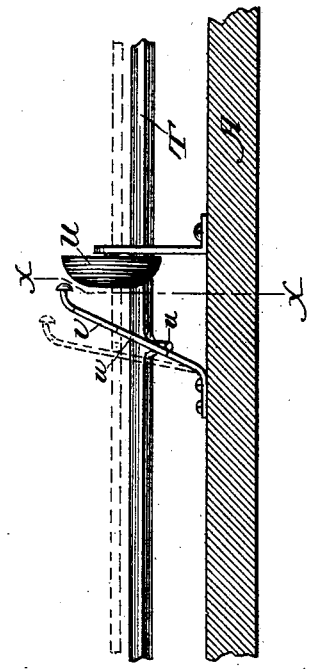

(No Model.) 4 Sheets—Sheet 3.

T. CARNEY.
CASH REGISTER AND INDICATOR.

No. 377,728. Patented Feb. 7, 1888.

Witnesses:
Albert H. Adams.
Harry T. Jones.

Inventor:
Thomas Carney (No Model.) 4 Sheets—Sheet 4.
T. CARNEY.
CASH REGISTER AND INDICATOR.
No. 377,728. Patented Feb. 7, 1888.
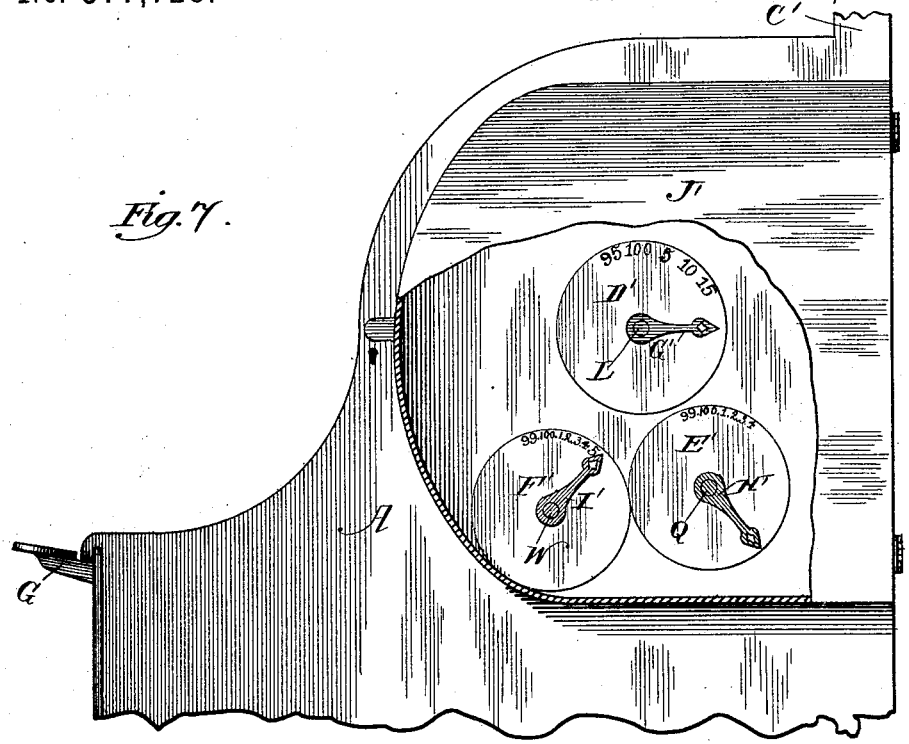
Fig. 7.
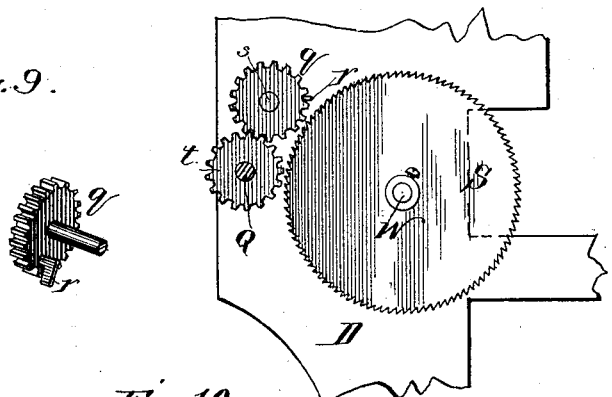
Fig. 8.
Fig. 9.
Fig. 10.
Witnesses:
Albert H. Adams.
Harry T. Jones.
Inventor:
Thomas Carney

UNITED STATES PATENT OFFICE.

THOMAS CARNEY, OF CHICAGO, ILLINOIS, ASSIGNOR TO MOSES BENSINGER AND HARRY G. CARNEY, BOTH OF SAME PLACE.

CASH REGISTER AND INDICATOR.

SPECIFICATION forming part of Letters Patent No. 377,728, dated February 7, 1888.

Application filed April 16, 1887. Serial No. 235,109. (No model.)

*To all whom it may concern:*

Figure 1:
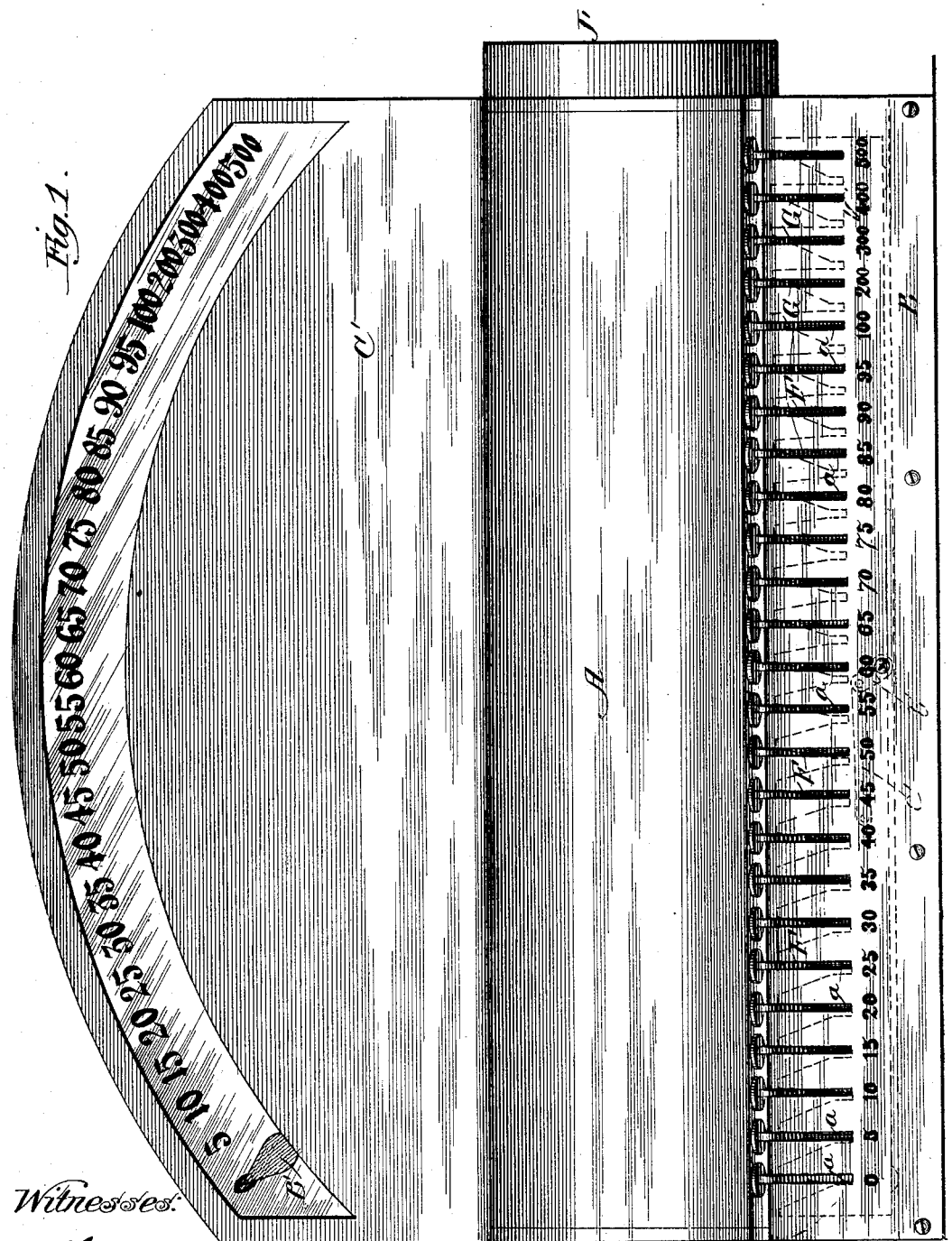
Figure 5:
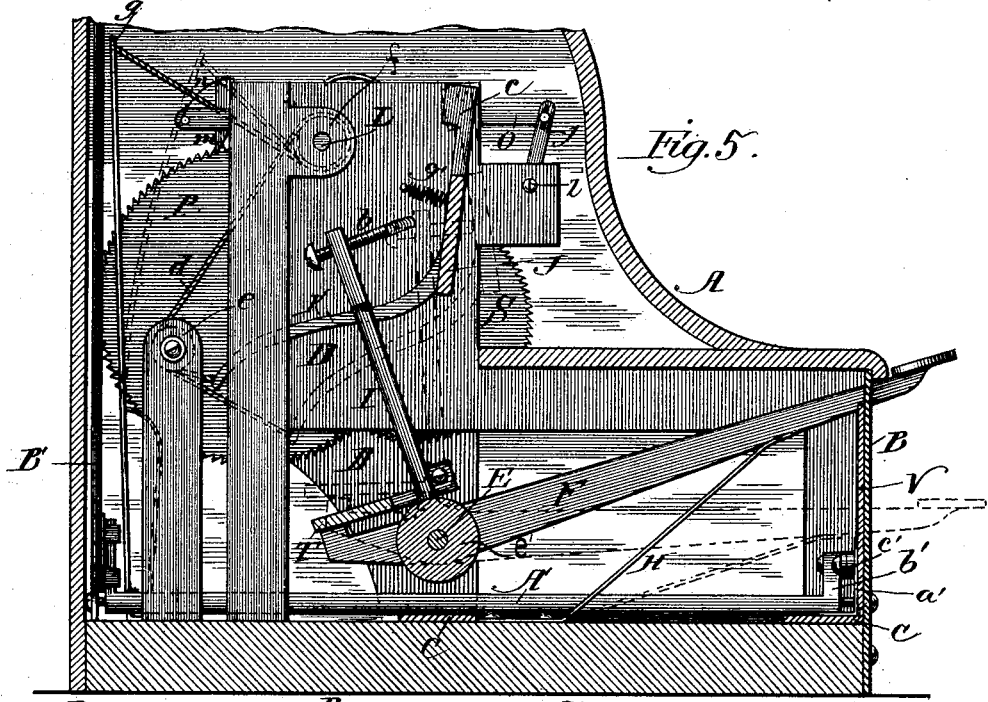
Figure 6:
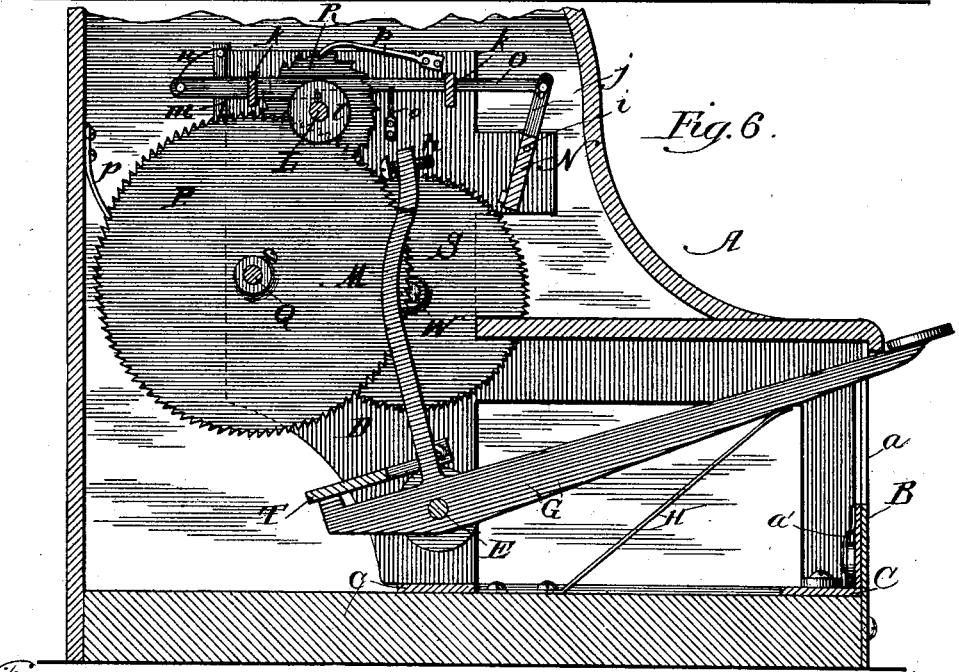

Be it known that I, THOMAS CARNEY, residing at Chicago, in the county of Cook and State of Illinois, and a citizen of the United States, have invented a new and useful Improvement in Cash Registers and Indicators, of which the following is a specification, reference being had to the accompanying drawings, in which—
Figure 1 is a front elevation. Fig. 2 is a plan of the operative parts detached from their inclosing-case. Fig. 3 is a detail showing the bell and striker, and taken from the rear, as shown in Fig. 2. Fig. 4 is a detail of the bell-striking devices, being a section at line $x$ of Fig. 3. Fig. 5 is a section at line $x$ of Fig. 2, looking to the right. Fig. 6 is a section at line $y$ of Fig. 2, looking to the right. Fig. 7 is an end elevation of the parts represented, showing the dials, a portion of the door covering the same being cut away. Fig. 8 is a detail, being a section at line $z$ of Fig. 2, looking to the right. Fig. 9 is a detail of one of the pinions with its pin. Fig. 10 is a detail, being a front elevation of the main bar, by the movement of which, with other devices, the pointer is operated.

My invention relates chiefly to devices for moving a pointer to indicate the several amounts of cash received, whether cents or dollars, and to improved devices for registering the total amounts which have been received during any given period of time, and to devices for ringing a bell, all as illustrated in the drawings and hereinafter fully described.

Those things which I claim as new will be pointed out in the claims.

In the drawings, A represents a suitable case or box in which the operating mechanism is inclosed.

B is the front of the lower part of the case, which, as represented, is supposed to be of metal, but might be of other material, and it is provided with a series of slots, $a$. In the case there is secured a metal frame, by which the principal parts of the operating mechanism are supported. This frame, as shown, consists, mainly, of a bed-piece, C, provided with suitable extensions at proper points and uprights D.

E is a shaft the ends of which are supported in bearings in the frame.

F are keys or levers pivoted on the shaft E. G are other keys or levers, each of which is also pivoted upon the shaft E. In connection with other devices the keys F are used for indicating sums less than one dollar, and the keys G are used to indicate dollars, from one to five, but not parts of a dollar.

H are springs, one for each (but one) of the keys F G.

I are arms, one of which extends upward from each one of the levers F. The upper end of each arm is, as shown, provided with an adjustable screw, $b$, which screws are of different lengths.

J is a sway-bar, each end of which is secured to a metal bar, $c$, which bars $c$ are pivoted at their upper ends to the frame.

K is an arm, one end of which is secured to the sway-bar J.

$d$ is a cord, one end of which is secured to the free end of the arm K. This cord passes over a pulley, $e$, then around a drum or enlargement, $f$, on a shaft, L, which is supported in suitable bearings in the frame. This cord passes from the drum or enlargement $f$ to a spring, $g$, to which it is secured.

M are arms secured one to each of the keys or levers G. These arms M are similar to the arms I, and in the upper end of each there is a screw, $h$, which screws are of different lengths.

N is a second short sway-bar pivoted at $i$ to the frame. $j$ is an arm extending up from this sway-bar N.

O is a horizontal bar pivoted at one end to the upper end of the arm $j$. This bar O passes through and is supported in slots in the bars $k$ $k$. This bar is enlarged not far from the center, as indicated in Fig. 6.

$l$ is a fixed collar on the shaft L, in which collar there is a pin arranged to come in contact with the enlarged part of the bar O, as indicated in Fig. 6.

$m$ is a tooth or pawl which passes loosely through a slot on one side of the bar O. The lower end of this pawl or tooth engages with the wheel P on the shaft Q.

$n$ is a spring which holds the tooth $m$ down, but permits it to rise to pass over the teeth of the wheel P, which is secured upon the shaft Q.

$o$ is a spring acting on the bar O.

$p\ p$ are spring-catches.

R is a ratchet-wheel on the shaft L.

S is a toothed wheel on the shaft W.

$q$ is a pinion provided with a pin, $r$, arranged to engage with the toothed wheel S, which pinion is supported on a stud, $s$.

$t$ is another pinion on the shaft Q, which pinion engages with the pinion $q$.

T is a swinging bar having short arms attached to its ends, which arms are pivoted to the frame. The inwardly-projecting ends of the levers F G are arranged to come in contact with the under side of this bar T. (See Figs. 5 and 6.)

$u$ is an arm projecting to the rearward from the swinging bar T.

$v$ is a bell-striker having two notches in one edge, as shown in Figs. 2 and 4, between which notches there is a projecting piece, $w$.

U is a bell.

V is a sliding bar located behind the front piece, B, of the case, and between it and the spring-arms $a'$, which hold it against the inside of the front piece, B, but do not prevent its longitudinal movement.

A' (see Figs. 2 and 5) is a rock-shaft suitably held in place.

B' is a pointer secured to an arm upon the rear end of the rock-shaft A'.

$b'$ is an arm extending upward from the front end of the rock-shaft A'.

$c'$ (see Fig. 2) is a short bar, one end of which is pivoted to the bar V, and the other end is pivoted to the upper end of the arm $b'$.

The sliding bar V is provided with a series of notches, $d'$, which notches differ considerably in form, as shown in Fig. 10, and indicated by dotted lines in Fig. 1. The first notch at the left hand has its right-hand side angular and its left-hand side vertical. The next one to the right has its right-hand side less angular than the right-hand side of the first notch, and its left-hand side slightly angular instead of vertical. The angularity of the succeeding notches varies gradually, as shown in the drawings. The notches are so arranged that each of the levers or keys F G, when depressed, acts upon one side of the notch in which it is located, thus moving the sliding bar V to the right or left, according to its position before the lever or key is depressed.

The rear portion, C', of the case extends up some way above that part which contains the principal operative parts, and is quite thin. In front and at the upper end of this part C' there is an opening, behind which are located a series of figures, as shown in Fig. 1, there being a zero-point; and the figures 5 to 95 are designed to indicate cents, while the figures from 100 to 500 are designed to indicate dollars. The opening in the case, through which the figures are exposed, may be covered by a glass. The upper end of the pointer extends up to the figures last mentioned, as shown in Fig. 1. The keys are provided with figures corresponding with those at the top of the case. These figures may be also on the face of the case, if desired.

D' E' F' are three dials located on the outside of one end of the case.

G' is a pointer on the outer end of the shaft L.

H' is another pointer on the outer end of the shaft Q.

I' is a pointer on the outer end of the shaft W.

J' is a door which closes over the dials and pointers.

$e'$ are collars on the shaft E between the levers or keys thereof.

$f'$, Fig. 2, is a spring which answers the purpose of one of the springs H.

The pointers G' H' I' are held on their respective shafts by friction, but can be moved thereon by hand. The ratchet-wheel R has twenty teeth. The two wheels P S have each one hundred teeth.

In use the pointer B' and the pointers G' H' I' are, when commencing, to be set at zero. The salesman will be required to operate at every sale one or more of the keys F or G corresponding with the amount of sale. Suppose the pointer B' to be at zero, then if a sale be made amounting, say, to ten cents, the operator will depress the key over the figure 10 on the lower part of the front of the case, and the key, coming in contact with the left side of the notch through which it passes in the bar V, will move said bar V a little to the right, and by the movement of this bar V, the small bar $c'$ and the rock-shaft A', the pointer B' will be carried to the figure 10 at the top of the case. At the same time the end of the screw $b$ in the upper end of the arm I which extends upward from the key will come in contact with the rear side of the sway-bar J and cause it to swing a given distance on its pivotal supports, which will move the arm K, which is secured to this sway-bar J, and the cord $d$, which passes over the drum on the shaft L, will cause such drum and shaft to make a partial revolution, enough in this case to move the ratchet-wheel R forward two notches, such wheel being moved one notch for every five cents. If then the next sale be, say, seventy cents, the operator must depress the proper key, which will carry the pointer B' over to the figure 70 at the top of the case and the sway-bar will be moved a much greater distance than before by the longer screw in the proper arm I. In this case the wheel R would be moved fourteen notches. If the next sale should be, say, twenty cents, the operator depresses the proper key and the opposite inclination of the twenty-cent notch $d$, giving the bar V a movement in the direction opposite to that imparted by the seventy-cent key and notch, the pointer B' will be carried back to the figure 20 at the top of the case, and the sway-bar will be moved far enough to carry the wheel R forward four notches. When the keys strike upon the left-hand side of the notches $d'$, the pointer is moved to the right. When they strike upon the right-hand side, it is moved to the left. When by the operation of the keys F the wheel R and shaft L have made one revolution, the pin in the collar $l$ on the shaft L will engage with the enlarged portion of the bar O, as shown in Fig. 6, moving it toward the rear of the machine, which movement will, through the pawl or tooth $m$, cause the wheel P to move one notch. The wheel R when operated by the keys F makes one revolution as often as sales to the amount of one hundred cents have been indicated by the pointer B'.

When the sale amounts to one dollar, or to any number of dollars up to five, such sales can be indicated and registered through the action of the levers G. The screws $h$ in the ends of the arms M of such levers G come in contact with the short sway-bar N, and, through it and the bar O and ratchet or tooth $m$, operate the wheel P directly, moving it one notch for one dollar, two notches for two dollars, &c., the distance which this sway-bar moves being determined by the length of the projecting ends of the screws $h$. When the levers G are operated, the sway-bar J, the arm K, cord $d$, and wheel R do not come into operation.

If a sale be made the amount of which is one or more dollars and a fractional part of a dollar, one of the keys G and one of the keys F must both be used to indicate and register the amount of such sale. The spring $g$ holds the cord $d$ taut upon the drum $f$. The springs H return the keys F G to their normal positions after they have been depressed, except that the central key is returned by the action of the spring $f'$. With each revolution of the wheel P—which wheel makes one revolution as often as sales to the amount of one hundred dollars have been indicated—the wheel S will move one notch through the action of the pinions $t\ q$ and the pin $r$ in $q$, which engages with the wheel S, and the total amount of sales during any given period will be indicated by the pointers G' H' I' and the figures on the dial.

In connection with the devices described I have provided a bell and devices for operating the same as often as one of the levers F G is depressed.

U is the bell.

$v$ is the striker.

T is a pivoted bar, with the under side of which the rear ends of the levers F G come in contact. On this bar T there is a projecting arm, $u$, Figs. 2, 3, and 4, which comes in contact with the part $w$ of the striker, carrying it back a little, and gives it sufficient tension to cause it upon its return movement to come in contact with the bell. The arm $u$, when it has reached its highest point, leaves $w$ and enters the upper notch in the striker $d$, and then drops to the position shown in Fig. 4, when the operating-key returns to its normal position. The spring $o$, Fig. 6, returns the bar O and sway-bar N to their normal positions. There is a coiled spring, $g'$, Fig. 5, which returns the sway-bar J to its normal position after it has been moved through the action of one of the levers, F. The form and location of the notches in the bar V must, in the first instance, be determined by trial. When one bar of the proper form has been made, any number can be readily made of the same form.

This apparatus is not adapted to indicate any smaller sum than five cents, and only multiples of five.

The distance which the wheel R moves by the depression of one of the levers F depends upon the distance which the sway-bar J moves, and such distance is determined by the length of the screw in the arm I, connected with the operating-lever. When the levers G are used, the wheel P will be moved one or more notches, depending upon the distance which the sway-bar N moves, which is determined by the length of the screws in the arms N, connected with the levers G.

What I claim as new, and desire to secure by Letters Patent, is—

1. The movable bar V, provided with a series of notches, $d'$, in combination with a rock-shaft, A', a pointer, B', a connecting-bar, $c'$, a series of keys or levers, a series of arms swung by said levers, screws adjustable in the ends of said arms, and registering mechanism, substantially as described, operated thereby, substantially as and for the purposes specified.

2. In an indicating and registering machine, a series of keys or levers, F, each having an arm, I, a sway-bar, J, an adjustable device to determine the distance which the sway-bar moves when acted on by the arms I, a shaft, L, carrying a wheel, R, and devices for partially rotating the shaft L when one of the keys is depressed, substantially as and for the purposes specified.

3. In an indicating and registering machine, a series of levers or keys, F, each provided with an arm, I, a sway-bar, J, shaft L, collar $l$, carrying a pin, sliding bar O, carrying a pawl or tooth, $m$, wheels R and P, and devices for partially rotating the shaft L when one of the levers is operated, substantially as and for the purposes specified.

4. In an indicating and registering machine, a series of keys or levers, F, each provided with an arm, I, in combination with a sway-bar, J, keys or levers G, each provided with an arm, M, sway-bar N, shaft L, collar $l$, bar O, provided with a pawl or tooth, $m$, devices for operating the shaft L when one of the keys is depressed, and adjustable devices to determine the distance the sway-bars will move when acted on by the keys, substantially as and for the purposes specified.

5. In an indicating and registering machine, a movable bar, V, provided with notches $d'$, in combination with a rock-shaft, A', a pointer secured to the rock-shaft, a connecting-bar, $c'$, a series of levers or keys, F, each provided with an arm, I, a sway-bar, J, shaft L, carrying a wheel, R, and collar *l*, provided with a pin, bar O, carrying a tooth or pawl, *m*, and wheel P, substantially as and for the purposes specified.

6. In an indicating and registering machine, the combination of a series of levers or keys with a swinging bar, T, provided with an arm, *u*, a bell, U, and a bell-striker, *v*, having a projection, *w*, arranged between two notches, substantially as and for the purposes specified.

THOMAS CARNEY.

Witnesses:
ALBERT H. ADAMS,
HARRY T. JONES.